(12) United States Patent
Sarwer et al.

(10) Patent No.: US 11,589,067 B2
(45) Date of Patent: Feb. 21, 2023

(54) METHOD FOR APPARATUS FOR DERIVING MAXIMUM SUB-BLOCK TRANSFORM SIZE

(71) Applicant: ALIBABA GROUP HOLDING LIMITED, Grand Cayman (KY)

(72) Inventors: Mohammed Golam Sarwer, San Mateo, CA (US); Jiancong Luo, San Mateo, CA (US); Yan Ye, San Mateo, CA (US)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 16/938,277

(22) Filed: Jul. 24, 2020

(65) Prior Publication Data

US 2021/0084321 A1    Mar. 18, 2021

Related U.S. Application Data

(60) Provisional application No. 62/900,395, filed on Sep. 13, 2019.

(51) Int. Cl.
| | | |
|---|---|---|
| H04N 11/02 | (2006.01) | |
| H04N 19/46 | (2014.01) | |
| H04N 19/176 | (2014.01) | |
| H04N 19/70 | (2014.01) | |
| H04N 19/60 | (2014.01) | |

(52) U.S. Cl.
CPC ........... *H04N 19/46* (2014.11); *H04N 19/176* (2014.11); *H04N 19/60* (2014.11); *H04N 19/70* (2014.11)

(58) Field of Classification Search
CPC .................................................... H04N 19/46

USPC ...................................... 375/240.01–240.29
See application file for complete search history.

(56) References Cited

U.S. PATENT DOCUMENTS

| | | |
|---|---|---|
| 9,854,241 B2 | 12/2017 | Rosewarne et al. |
| 2011/0194613 A1 | 8/2011 | Chen et al. |
| | (Continued) | |

FOREIGN PATENT DOCUMENTS

| | | |
|---|---|---|
| EP | 4002847 A1 | 5/2022 |
| EP | 4011076 A1 | 6/2022 |
| WO | WO 2021/047544 A1 | 3/2021 |

OTHER PUBLICATIONS

Chen et al. "Algorithm description of Joint Exploration Test Model 7 (JEM7)," Joint Video Experts Team (JVET), 7th Meeting: Torino, Italy, Jul. 13-21, 2017, JVET-G1001-v1, Jul. 2017, 48 pages.

(Continued)

*Primary Examiner* — Leron Beck

(74) *Attorney, Agent, or Firm* — Finnegan, Henderson, Farabow, Garrett & Dunner, LLP

(57) ABSTRACT

The present disclosure provides apparatus and methods for signaling sub-block transform (SBT) information. The SBT information is used for coding video data. According to certain disclosed embodiments, an exemplary method includes: signaling a first flag in a Sequence Parameter Set (SPS) of a video sequence indicating whether a sub-block transform (SBT) is enabled; and signaling a second flag indicating a maximum transform block (TB) size that allows the SBT. A maximum coding unit (CU) size that allows the SBT is determined directly based on the maximum TB size in response to the first flag indicating that the SBT is enabled.

20 Claims, 10 Drawing Sheets

(56) References Cited

U.S. PATENT DOCUMENTS

2017/0064335 A1    3/2017  Na et al.
2020/0186838 A1*   6/2020  Zhao .................... H04N 19/132

OTHER PUBLICATIONS

Sullivan et al., "Overview of the High Efficiency Video Coding (HEVC) Standard," IEEE Transactions on Circuits and Systems for Video Technology, vol. 22, No. 12, pp. 1649-1668, Dec. 2012.
Bross et al. "High Efficiency Video Coding (HEVC) text specification draft 10 (for FDIS & Last Call)" 12th Meeting: Geneva, CH, Jan. 14-23, 2013, JCTVC-L1003-v34, Mar. 2019, 310 pages.
Segall et al. "Joint Call for Proposals on Video Compression with Capability beyond HEVC" 8th Meeting: Macao, CN, Oct. 18-24, 2017, JVET-H1002 (v6), 27 pages.
Bross et al. "Versatile Video Coding (Draft 6)" 15th Meeting: Gothenburg, SE, Jul. 3-12, 2019, JVET-O2001-vE, 455 pages.
Chen et al. "Algorithm description for Versatile Video Coding and Test Model 6 (VTM 6)," Joint Video Experts Team (JVET), 15th Meeting: Gothenburg, SE, Jul. 3-12, 2019, JVET-O2002-v2, 87 pages.
International Search Report and Written Opinion in European Application No. PCT/US20/43448, dated Oct. 15, 2020 (8 pgs.).
European Patent Office Communication issued for Application No. 20863945.0 which encloses the extended European Search Report which includes pursuant to Rule 62 EPC, the Supplementary European Search Report (Art. 153(7) EPC) and the European search opinion, dated Nov. 10, 2022, 11 pages.
Bross et al., "Versatile Video Coding (Draft 6),"JVET-O2001-vE, 15$^{th}$ Meeting: Gothenburg, SE Jul. 3-12, 2019, 455 pages.
Naser et al., "Non-CE6: SPS Clean-up of SBT," JVET-P0346, 16$^{th}$ Meeting: Geneva, CH, Oct. 1-11, 2019, 2 pages.
Sarwer et al., "Non-CE6: A clean-up of SPS maximum SBT size signaling," JVET-P0391-V4, Non-CE6: 16$^{th}$ Meeting: Geneva, CH, 1-11, Oct. 2019.

* cited by examiner

Table 1: Exemplary SPS syntax that signals sps_sbt_max_size_64_flag only when both sps_max_luma_transform_size_64_flag and sps_sbt_enabled_flag are 1

| seq_parameter_set_rbsp( ) { | Descriptor |
|---|---|
|   sps_max_luma_transform_size_64_flag | u(1) |
|   if( ChromaArrayType != 0 ) { | |
|     same_qp_table_for_chroma | u(1) |
|     for( i = 0; i < same_qp_table_for_chroma ? 1 : 3; i++ ) { | |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_out_val[ i ][ j ] | ue(v) |
|       } | |
|     } | |
|   } | |
|   sps_weighted_pred_flag | u(1) |
|   sps_weighted_bipred_flag | u(1) |
|   sps_sao_enabled_flag | u(1) |
|   sps_alf_enabled_flag | u(1) |
|   sps_transform_skip_enabled_flag | u(1) |
|   if( sps_transform_skip_enabled_flag ) | |
|     sps_bdpcm_enabled_flag | u(1) |
|   sps_joint_cbcr_enabled_flag | u(1) |
|   sps_ref_wraparound_enabled_flag | u(1) |
|   if( sps_ref_wraparound_enabled_flag ) | |
|     sps_ref_wraparound_offset_minus1 | ue(v) |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   sps_smvd_enabled_flag | u(1) |
|   sps_dmvr_enabled_flag | u(1) |
|   if( sps_bdof_enabled_flag || sps_dmvr_enabled_flag) | |
|     sps_bdof_dmvr_slice_present_flag | u(1) |
|   sps_mmvd_enabled_flag | u(1) |
|   sps_isp_enabled_flag | u(1) |
|   sps_mrl_enabled_flag | u(1) |
|   sps_mip_enabled_flag | u(1) |
|   if( ChromaArrayType != 0 ) | |
|     sps_cclm_enabled_flag | u(1) |
|     if( sps_cclm_enabled_flag && chroma_format_idc == 1 ) | |
|       sps_cclm_colocated_chroma_flag | u(1) |
|   sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) |
|   } | |
|   sps_sbt_enabled_flag | u(1) |
|   if( sps_sbt_enabled_flag && *sps_max_luma_transform_size_64_flag*) | |
|     sps_sbt_max_size_64_flag | u(1) |

FIG. 6

Table 2: Exemplary SPS syntax table that does not use sps_sbt_max_size_64_flag

| seq_parameter_set_rbsp( ) { | Descriptor |
|---|---|
|   sps_max_luma_transform_size_64_flag | u(1) |
|   if( ChromaArrayType != 0 ) { | |
|     same_qp_table_for_chroma | u(1) |
|     for( i = 0; i < same_qp_table_for_chroma ? 1 : 3; i++ ) { | |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_out_val[ i ][ j ] | ue(v) |
|       } | |
|     } | |
|   } | |
|   sps_weighted_pred_flag | u(1) |
|   sps_weighted_bipred_flag | u(1) |
|   sps_sao_enabled_flag | u(1) |
|   sps_alf_enabled_flag | u(1) |
|   sps_transform_skip_enabled_flag | u(1) |
|   if( sps_transform_skip_enabled_flag ) | |
|     sps_bdpcm_enabled_flag | u(1) |
|   sps_joint_cbcr_enabled_flag | u(1) |
|   sps_ref_wraparound_enabled_flag | u(1) |
|   if( sps_ref_wraparound_enabled_flag ) | |
|     sps_ref_wraparound_offset_minus1 | ue(v) |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   sps_smvd_enabled_flag | u(1) |
|   sps_dmvr_enabled_flag | u(1) |
|   if( sps_bdof_enabled_flag || sps_dmvr_enabled_flag) | |
|     sps_bdof_dmvr_slice_present_flag | u(1) |
|   sps_mmvd_enabled_flag | u(1) |
|   sps_isp_enabled_flag | u(1) |
|   sps_mrl_enabled_flag | u(1) |
|   sps_mip_enabled_flag | u(1) |
|   if( ChromaArrayType != 0 ) | |
|     sps_cclm_enabled_flag | u(1) |
|     if( sps_cclm_enabled_flag && chroma_format_idc == 1 ) | |
|       sps_cclm_colocated_chroma_flag | u(1) |
|   sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) |
|   } | |
|   sps_sbt_enabled_flag | u(1) |
|   ~~if( sps_sbt_enabled_flag )~~ | |
|     ~~sps_sbt_max_size_64_flag~~ | ~~u(1)~~ |

FIG. 8

Table 3: Exemplary CU syntax that directly uses MaxTbSizeY to set the maximum CU width and height

| | |
|---|---|
| if( cu_cbf ) { | |
|   if( CuPredMode[ chType ][ x0 ][ y0 ] = = MODE_INTER && sps_sbt_enabled_flag<br>    && !ciip_flag[ x0 ][ y0 ] && !MergeTriangleFlag[ x0 ][ y0 ] ) { | |
|     if( cbWidth <= *MaxTbSizeY* && cbHeight <= *MaxTbSizeY* ) { | |
|       allowSbtVerH = cbWidth >= 8 | |
|       allowSbtVerQ = cbWidth >= 16 | |
|       allowSbtHorH = cbHeight >= 8 | |
|       allowSbtHorQ = cbHeight >= 16 | |
|       if( allowSbtVerH \|\| allowSbtHorH \|\| allowSbtVerQ \|\| allowSbtHorQ ) | |
|         cu_sbt_flag | ae(v) |
|     } | |
|     if( cu_sbt_flag ) { | |
|       if( ( allowSbtVerH \|\| allowSbtHorH ) && ( allowSbtVerQ \|\| allowSbtHorQ) ) | |
|         cu_sbt_quad_flag | ae(v) |
|       if( ( cu_sbt_quad_flag && allowSbtVerQ && allowSbtHorQ ) \|\|<br>        ( !cu_sbt_quad_flag && allowSbtVerH && allowSbtHorH ) ) | |
|         cu_sbt_horizontal_flag | ae(v) |
|         cu_sbt_pos_flag | ae(v) |
|     } | |
|   } | |

FIG. 9

METHOD FOR APPARATUS FOR DERIVING MAXIMUM SUB-BLOCK TRANSFORM SIZE

CROSS-REFERENCE TO RELATED APPLICATIONS

The present disclosure claims priority to U.S. Provisional Application No. 62/900,395, filed on Sep. 13, 2019, which is incorporated herein by reference in its entirety.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of the present disclosure provide a method and apparatus for video processing. In one exemplary embodiment, a video processing method includes: signaling a first flap in a Sequence Parameter Set (SPS) of a video sequence indicating whether a sub-block transform (SBT) is enabled; and signaling a second flag indicating a maximum transform block (TB) size that allows the SBT. A maximum coding unit (CU) size that allows the SBC can be determined directly based on the maximum TB size in response to the first flag indicating that the SBT is enabled.

In another exemplary embodiment, a video processing apparatus includes: at least one memory for storing instructions and at least one processor. The at least one processor to execute the instructions to cause the apparatus to perform: signaling a first flag in a Sequence Parameter Set (SPS) of a video sequence indicating whether a sub-block transform (SBT) is enabled; and signaling second flag indicating a maximum transform block (TB) size that allows the SBT. A maximum coding unit (CU) size that allows the SBT is determined directly based on the maximum TB size in response to the first flag indicating that the SBT is enabled.

In another exemplary embodiment, a non-transitory computer-readable storage medium stores a set of instructions. The set of instructions is executable by at least one processor to cause the computer to perform a video processing method. The method includes: signaling a first flag in a Sequence Parameter Set (SPS) of a video sequence indicating whether a sub-block transform (SBT) is enabled; and signaling a second flag indicating a maximum transform block (TB) size that allows the SBT. A maximum coding unit (CU) size that allows the SBT is determined directly based on the maximum TB size in response to the first flag indicating that the SBT is enabled.

BRIEF DESCRIPTION OF THE DRAWINGS

Embodiments and various aspects of the present disclosure are illustrated in the following detailed description and the accompanying figures. Various features shown in the figures are not drawn to scale.

FIG. 6 illustrates an exemplary Table 1 showing a part of the SPS syntax table, according to some embodiments of the present disclosure.

FIG. 8 illustrates an exemplary Table 2 showing a part of the SPS syntax table, according to some embodiments of the present disclosure.

FIG. 9 illustrates an exemplary Table 3 showing a part of CU syntax table, according to some embodiments of the present disclosure.

DETAILED DESCRIPTION

Figure 1:
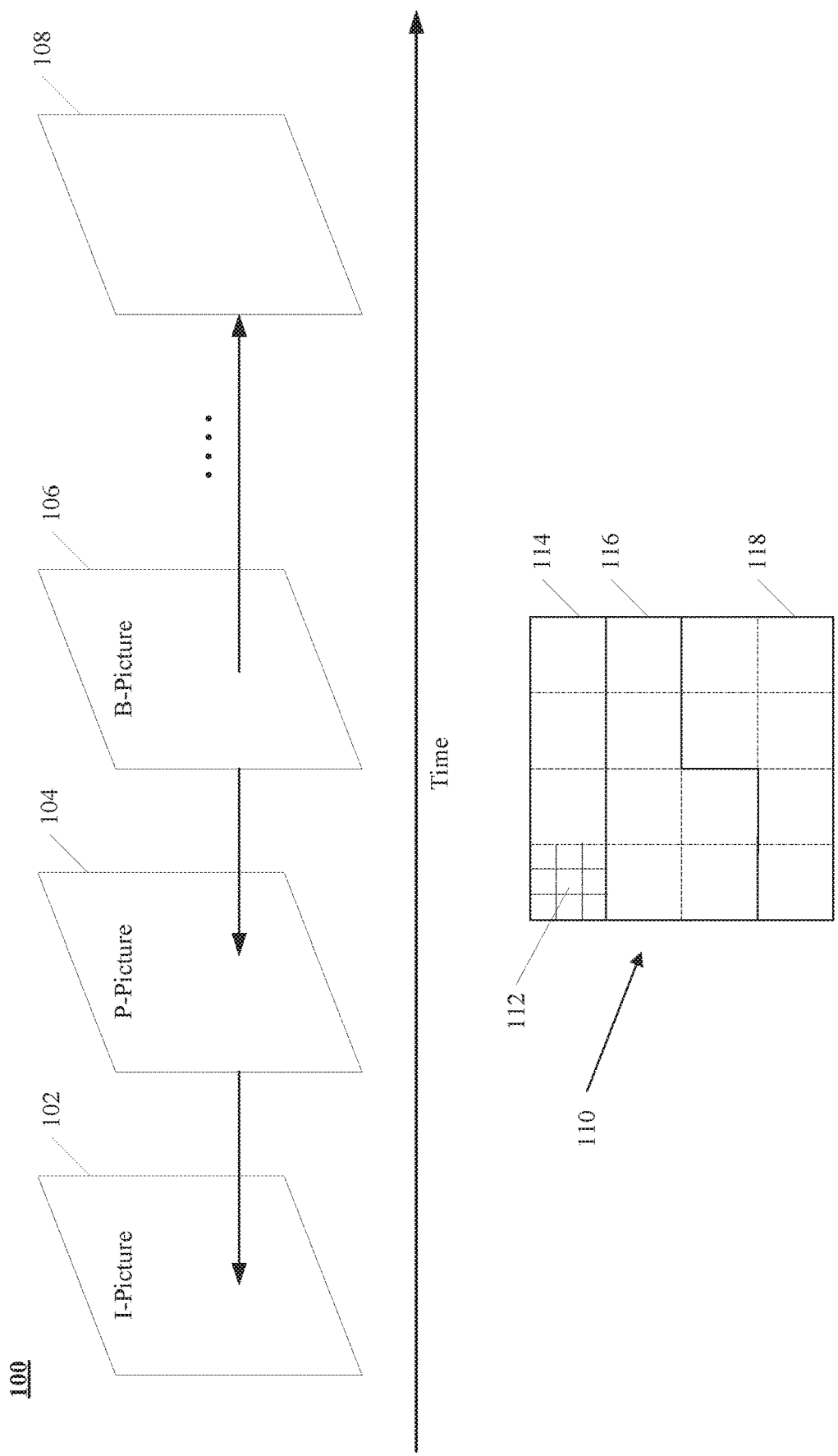
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Figure 2:
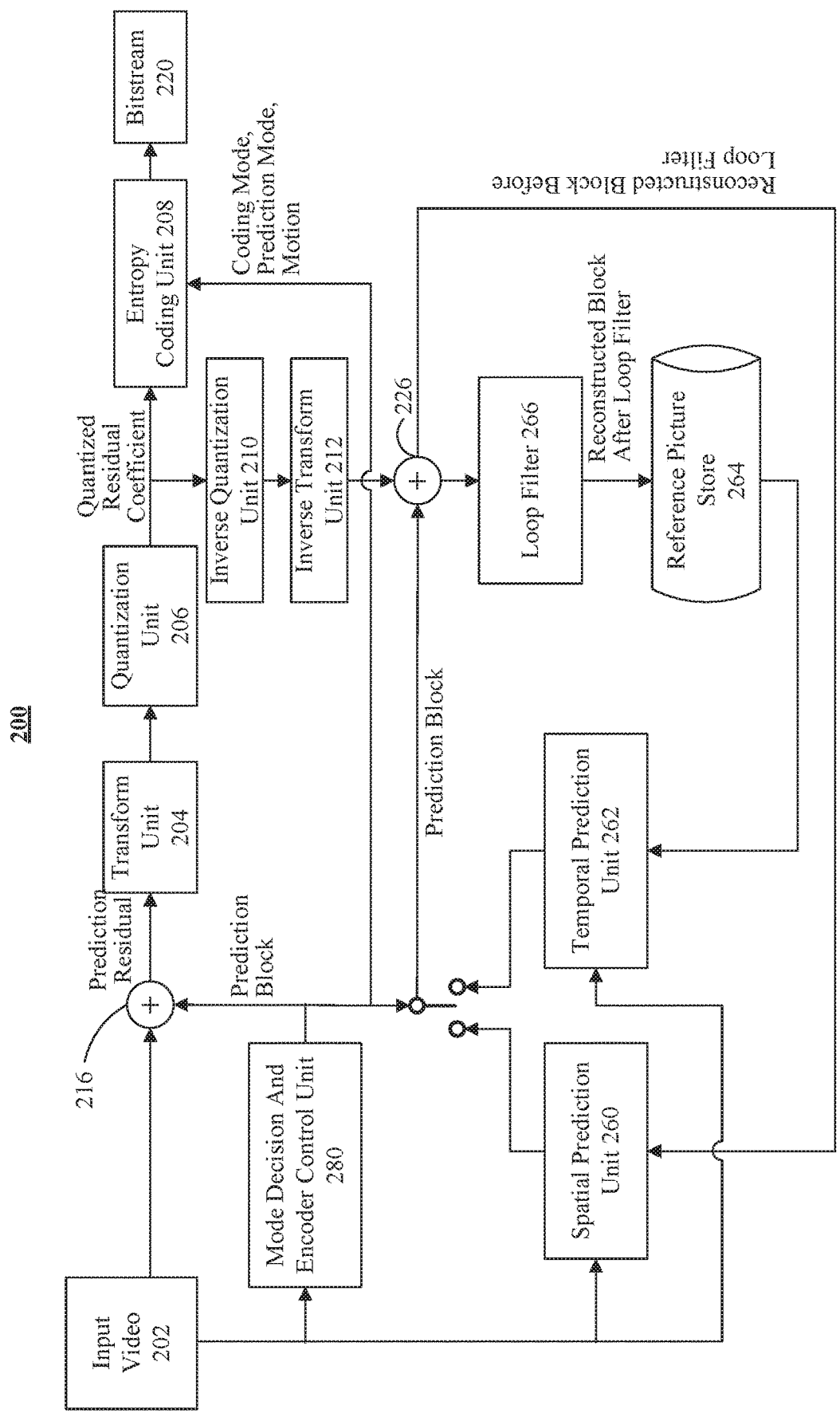
FIG. 2 illustrates a schematic diagram of an exemplary encoder in a hybrid video coding system, according to some embodiments of the present disclosure.
Figure 3:
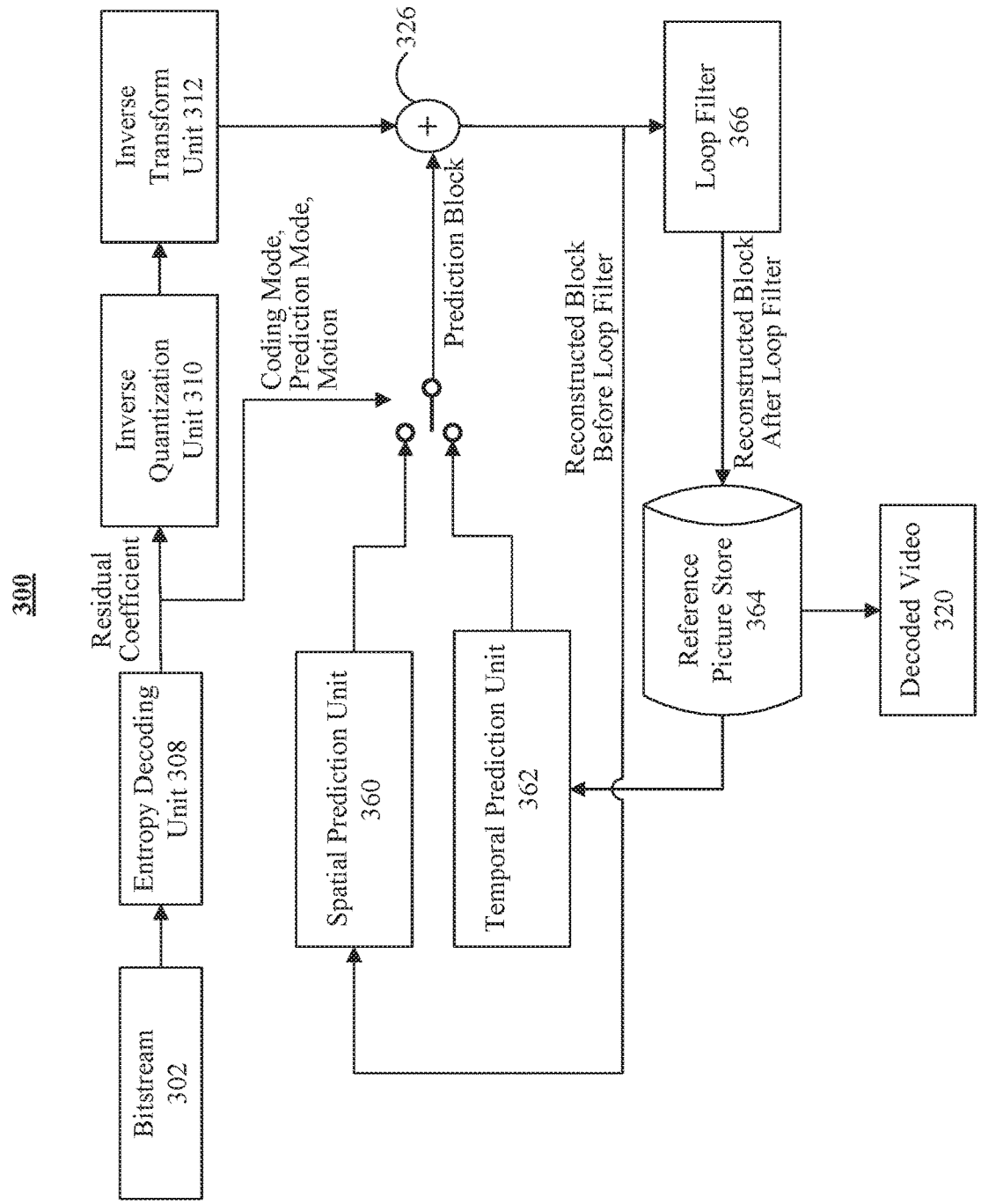
FIG. 3 illustrates a schematic diagram of an exemplary decoder in a hybrid video coding system, according to some embodiments of the present disclosure.

Video coding has multiple stages of operations, examples of which are shown in FIG. 2 and FIG. 3. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which is shown in FIG. 2), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIG. 2), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage example of which is shown in FIG. 2), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2 illustrates a schematic diagram of an exemplary encoder 200 in a hybrid video coding system, according to some embodiments of the present disclosure. Video encoder 200 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes. Inter modes (such as uni-prediction or bi-prediction) may refer to a number of temporal-based compression modes.

Referring to FIG. 2, input video signal 202 may be processed block by block. For example, the video block unit may be a 16×16 pixel block (e.g., a macroblock (MB)). The size of the video block units may vary, depending on the coding techniques used, and the required accuracy and efficiency. In HEVC, extended block sizes (e.g., a coding tree unit (CTU)) may be used to compress video signals of resolution, e.g., 1080p and beyond. In HEVC, a CTU may include up to 64×64 luma samples corresponding chroma samples, and associated syntax elements. In VVC, the size of a CTU may be further increased to include 128×128 luma samples, corresponding chroma samples, and associated syntax elements. A CTU can be further divided into coding units (CUs) using, for example, quad-tree, binary tree, or ternary tree. A CU may be further partitioned into prediction units (PUs), for which separate prediction methods may be applied. Each input video block may be processed by using spatial prediction unit 260 or temporal prediction unit 262.

Spatial prediction unit 260 performs spatial prediction (e.g., intra prediction) to the current block/CU using information on the same picture/slice containing the current block. Spatial prediction may use pixels from the already coded neighboring blocks in the same video picture frame/slice to predict the current video block. Spatial prediction may reduce spatial redundancy inherent in the video signal.

Temporal prediction unit 262 performs temporal prediction (e.g., inter prediction) to the current block using information from picture(s)/slice(s) different from the picture/slice containing the current block. Temporal prediction for a video block may be signaled by one or more motion vectors.

In unit-directional temporal prediction, only one motion vector indicating one reference picture is used to generate the prediction signal for the current block. On the other hand, in bi-directional temporal prediction, two motion vectors, each indicating a respective reference picture, can be used to generate the prediction signal for the current block. The motion vectors may indicate the amount and the direction of motion between the current block and one or more associated block(s) in the reference frames. If multiple reference pictures are supported, one or more reference picture indices may be sent for a video block. The one or more reference indices may be used to identify from which reference picture(s) in the reference picture store or decoded picture buffer (DPB) 264, the temporal prediction signal may come.

Mode decision and encoder control unit 280 in the encoder may choose the prediction mode, for example, based on rate-distortion optimization. Based on the determined prediction mode, the prediction block can be obtained. The prediction block may be subtracted from the current video block at adder 216. The prediction residual may be transformed by transformation unit 204 and quantized by quantization unit 206. The quantized residual coefficients may be inverse quantized at inverse quantization unit 210 and inverse transformed at inverse transform unit 212 to form the reconstructed residual. The reconstructed residual may be added to the prediction block at adder 226 to form the reconstructed video block. The reconstructed video block before loop-filtering may be used to provide reference samples for intra prediction.

The reconstructed video block may go through loop filtering at loop filter 266. For example, loop filtering such as deblocking filter, sample adaptive offset (SAO), and adaptive loop filter (ALF) may be applied. The reconstructed block after loop filtering may be stored in reference picture store 264 and can be used to provide inter prediction reference samples for coding other video blocks. To form the output video bitstream 220, coding mode (e.g., inter or intra), prediction mode information, motion information, and quantized residual coefficients may be sent to the entropy coding unit 208 to further reduce the bit rate, before the data are compressed and packed to form bitstream 220.

FIG. 3 illustrates a schematic diagram of an exemplary decoder 300 in a hybrid video coding system, according to some embodiments of the present disclosure. Referring to FIG. 3, a video bitstream 302 may be unpacked or entropy decoded at entropy decoding unit 308. The coding mode information can be used to determine whether the spatial prediction unit 360 or the temporal prediction unit 362 is to be selected. The prediction mode information can be sent to the corresponding prediction unit to generate the prediction block. For example, motion compensated prediction may be applied by the temporal prediction unit 362 to form the temporal prediction block.

The residual coefficients may be sent to inverse quantization unit 310 and inverse transform unit 312 to obtain the reconstructed residual. The prediction block and the reconstructed residual can be added together at 326 to form the reconstructed block before loop filtering. The reconstructed block may then go through loop filtering at loop filer 366. For example, loop filtering such as deblocking filter, SAO, and ALF may be applied. The reconstructed block after loop filtering can then be stored in reference picture store 364. The reconstructed data in the reference picture store 364 may be used to obtain decoded video 320, or used to predict future video blocks. Decoded video 320 may be displayed on a display device, such as a TV, a PC, a smartphone, or a tablet to be viewed by the end-users.

Figure 4:
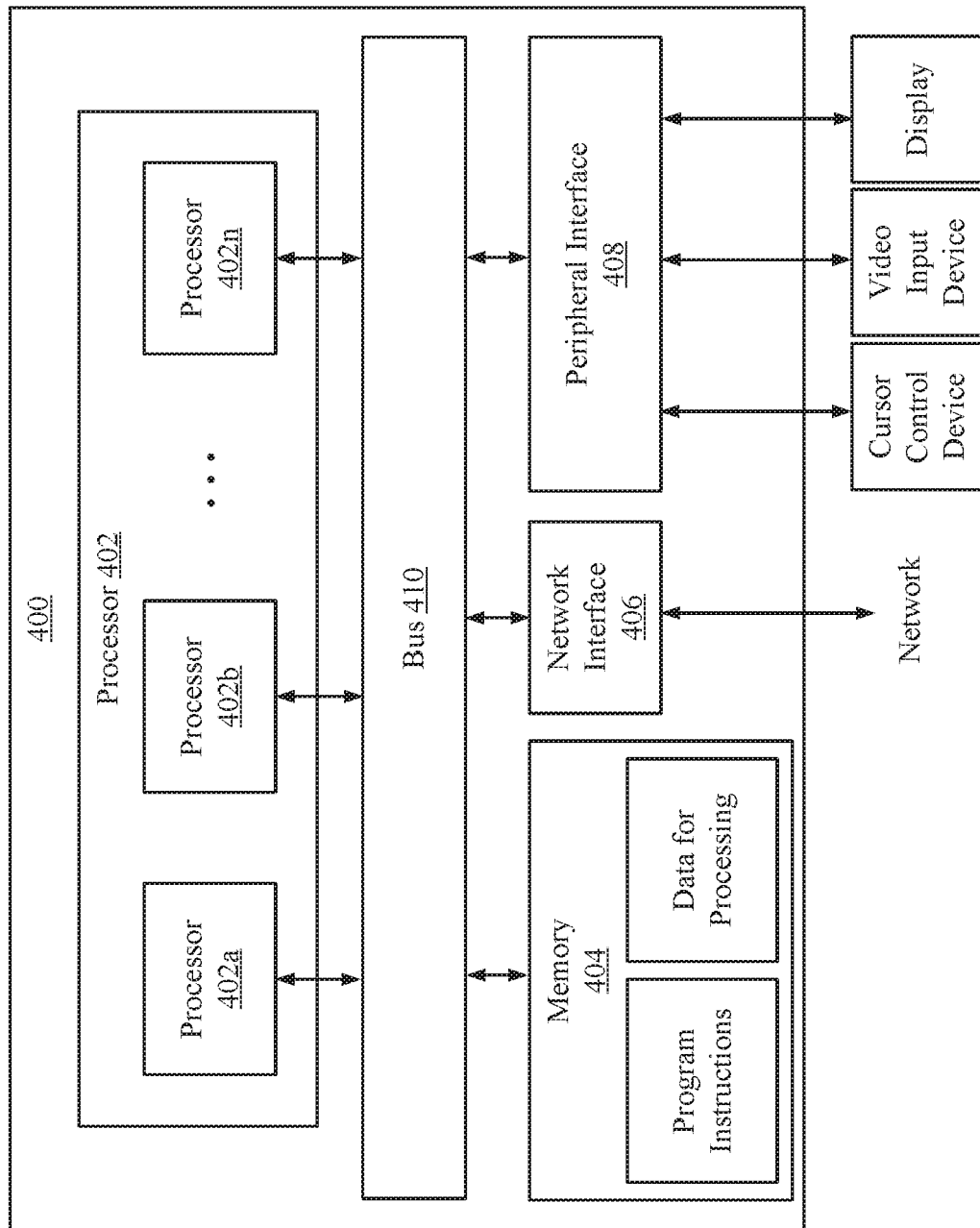
FIG. 4 illustrates a block diagram of an exemplary apparatus for encoding or decoding a video, according to some embodiments of the present disclosure.

FIG. 4 is a block diagram of an exemplary apparatus 400 for encoding or decoding a video, according to some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in FIG. 2 or FIG. 3) and data for processing. Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in the present disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs can be implemented as any combination of any software or hardware modules in apparatus 400. For example, some or all stages of encoder 200 of FIG. 2 or decoder 300 of FIG. 3 can be implemented as one or more software modules of apparatus 400, such as program instructions that can be loaded into memory 404. For another example, some or all stages of encoder 200 of FIG. 2 or decoder 300 of FIG. 3 can be implemented as one or more hardware modules of apparatus 400, such as a specialized data processing circuit (e.g., an FPGA, an ASIC, an NPU, or the like).

In the quantization and inverse quantization functional blocks (e.g., quantization unit 206 and inverse quantization unit 210 of FIG. 2, inverse quantization unit 310 of FIG. 3), a quantization parameter (QP) is used to determine the amount of quantization (and inverse quantization) applied to the prediction residuals. Initial QP values used for coding of a picture or slice may be signaled at the high level, for example, using syntax element init_qp_minus26 in the Picture Parameter Set (PPS) and using syntax element slice_qp_delta in the slice header. Further, the QP values may be adapted at the local level for each CU using delta QP values sent at the granularity of quantization groups.

In VVC, sub-block transform (SBT) is used for an inter-predicted coding unit (CU). In this transform mode, only a sub-part of the residual block is coded for the CU. When inter-predicted CU with syntax element cu_cbf is equal to 1, syntax element cu_sbt_flag can be signaled to indicate whether the whole residual block or a sub-part of the residual block is coded. In the former case, inter multiple transform selected (MTS) information is further parsed to determine the transform type of the CU. In the latter case, a part of the residual block is coded with inferred adaptive transform and the other part of the residual block is zeroed out.

Figure 5:
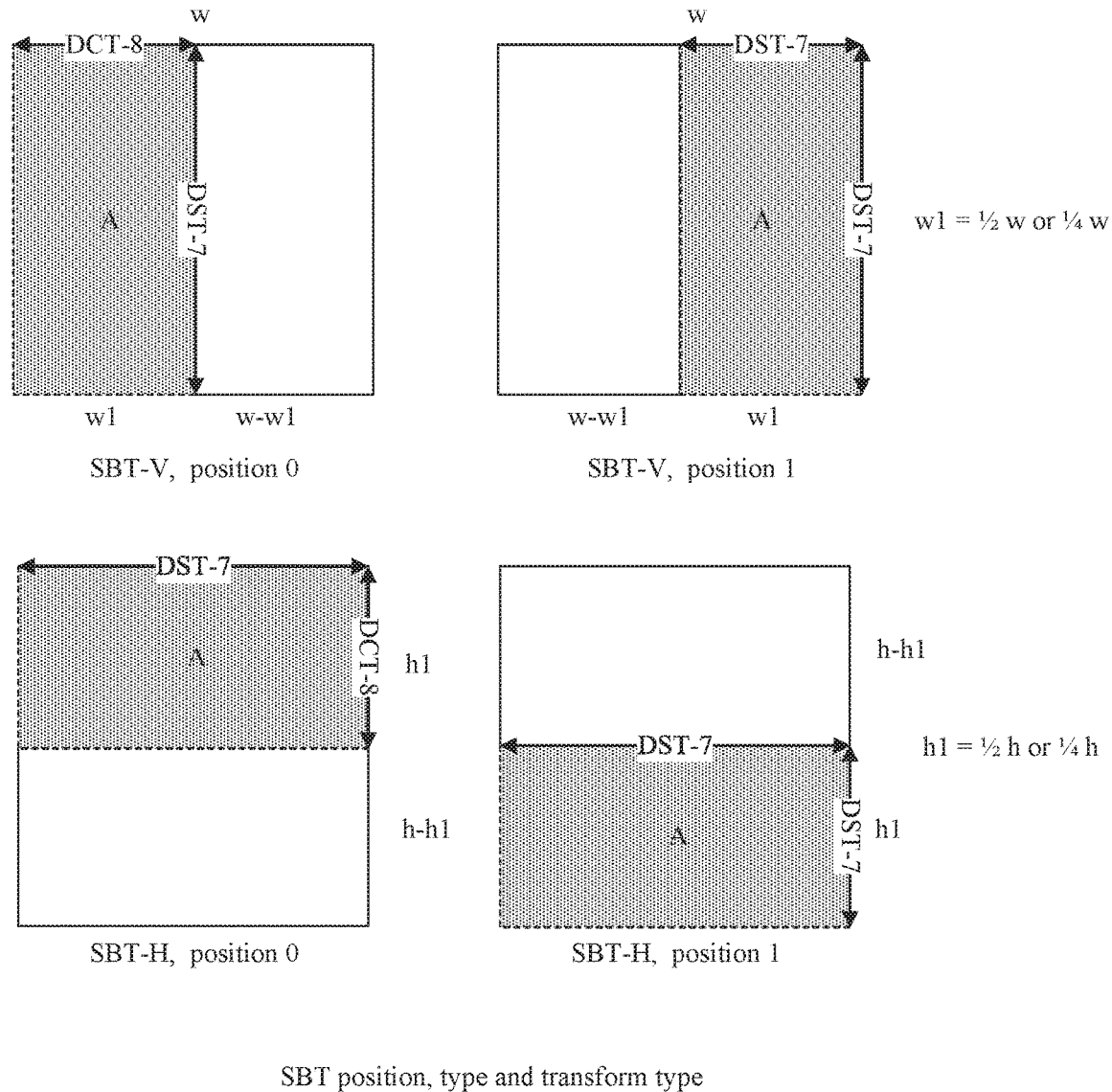
FIG. 5 illustrates exemplary sub-block transform (SBT) types and SBT positions for an inter-predicted coding unit (CU), according to some embodiments of the present disclosure.

When SBT is used for an inter-predicted CU, SBT type and SBT position information are signaled in the bitstream. There are two SBT types and two SBT positions, as illustrated in FIG. 5. For SBT-V (or SBT-H), the transform unit (TU) width (or height) can be equal to half of the CU width (or height) or ¼ of the CU width (or height), resulting in 2:2 split or 1:3/3:1 split. The 2:2 split is like a binary tree (BT) split while the 1:3/3:1 split is like an asymmetric binary tree (ABT) split. In ABT splitting, only the small region contains the non-zero residual. If one dimension of a CU is 8 in luma samples, the 1:3/3:1 split along that dimension is disallowed. There are at most 8 SBT modes for a CU.

The Sequence Parameter Set (SPS) level syntax can use syntax element sps_sbt_enabled_flag to specify whether SBT is enabled or disabled. When syntax element sps_sbt_enabled_flag is equal to 0, it signals that SBT for inter-predicted CUs is disabled for the entire video sequence that refers to this SPS. When syntax element sps_sbt_enabled_flag is equal to 1, it signals that SBT for inter-predicted CU is enabled for the entire video sequence that refers to this SPS.

Moreover, when sps_sbt_enabled_flag is equal to 1, another SPS syntax element sps_sbt_max_size_64_flag can be used to specify the maximum CU width and height for which SBT is allowed. When syntax element sps_sbt_max_size_64_flag is equal to 0, it signals that the maximum CU width and height for allowing SBT is 32 luma samples. When syntax element sps_sbt_max_size_64_flag is equal to 1, it signals that the maximum CU width and height for allowing SBT is 64 luma samples. The variable MaxSbtSize that can specify the maximum allowed CU size for SBT is computed based on the following Equation 1:

$$MaxSbtSize=Min(MaxTbSizeY, sps\_sbt\_max\_size\_64\_flag? 64:32) \quad (Eq. 1)$$

where MaxTbSizeY is the maximum allowed transform block (TB) size and can be derived from another SPS level syntax element, sps_max_luma_transform_size_64_flag, according to the following Equation 2:

$$MaxTbSizeY=sps\_max\_luma\_transform\_size\_64\_flag? 64:32 \quad (Eq. 2)$$

As described above, MaxSbtSize derivation depends on the two syntax elements sps_max_luma_transform_size_64_flag and sps_sbt_max_size_64_flag. If the value of syntax element sps_max_luma_transform_size_64_flag=0, MaxSbtSize is always 32, regardless of the value of syntax element sps_sbt_max_size_64_flag. Therefore, it is not required to signal syntax element sps_sbt_max_size_64_flag when syntax element sps_max_luma_transform_size_64_flag is zero. Such syntax redundancy in VVC increases signaling overhead unnecessarily.

To improve the video coding efficiency, according to some disclosed embodiments, syntax element sps_sbt_max_size_64_flag is signaled only when both syntax elements sps_max_luma_transform_size_64_flag and sps_sbt_enabled_flag are 1. FIG. 6 illustrates an exemplary Table 1, according to some embodiments of the present disclosure. Table 1 shows an exemplary SPS syntax table of some embodiments. As shown in Table 1 (emphases shown in italics), syntax element sps_sbt_max_size_64_flag is signaled only if both syntax elements sps_max_luma_transform_size_64_flag and sps_sbt_enabled_flag are 1. If syntax element sps_max_luma_transform_size_64_flag is 0, syntax element sps_sbt_max_size_64_flag can be inferred to be zero meaning that the maximum CU width and height that allow SBT are 32 (in units of luma samples).

Figure 7:
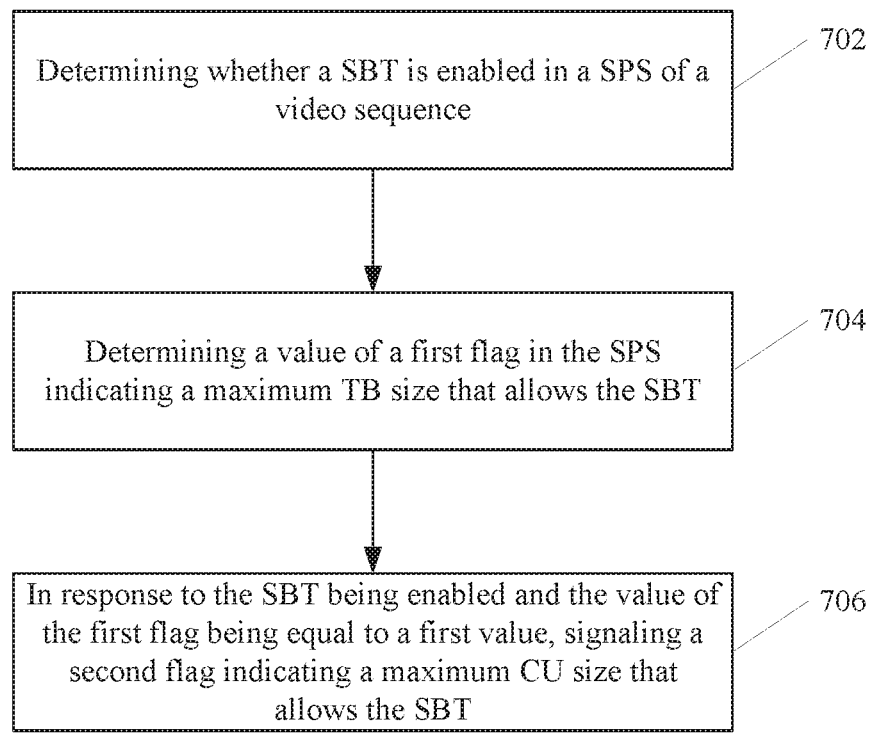
FIG. 7 illustrates a flowchart of an exemplary video processing method, according to some embodiments of the present disclosure.

FIG. 7 illustrates a flowchart of an exemplary video processing method 700, according to some embodiments of the present disclosure. In some embodiments, method 700 can be performed by an encoder (e.g., encoder 200 of FIG. 2), decoder (e.g., decoder 300 of FIG. 3) or one or more software or hardware components of an apparatus (e.g., apparatus 400 of FIG. 4). For example, a processor (e.g., processor 402 of FIG. 4) can perform method 700. In some embodiments, method 700 can be implemented by a computer program product, embodied in a computer-readable medium, including computer-executable instructions, such as program code, executed by computers (e.g., apparatus 400 of FIG. 4).

At step 702, method 700 can include determining whether a sub-block transform (SBT) is enabled in a Sequence Parameter Set (SPS) of a video sequence. In some embodiments, a flag (e.g., syntax element sps_sbt_enabled_flag as shown in Table 1 of FIG. 6) can be signaled in the SPS indicating whether the SBT is enabled. For example, syntax element sps_sbt_enabled_flag being equal to 0 can specify that SBT for inter-predicted CUs is disabled for the whole video sequence that refers to the SPS. And syntax element sps_sbt_enabled_flag equal to 1 can specify that SBT for inter-predicted CUs is enabled for the whole video sequence that refers to the SPS.

At step 704, method 700 can include determining a value of a first flag in the SPS indicating a maximum transform block (TB) size that allows the SBT. The first flag can be set to a first vale or a second value. For example, the first value is 1 and the second value is 0. The maximum TB size can be 32, 64, or the like. In some embodiments, method 700 can also include in response to the maximum TB size being 64, setting the value of the first flag to be the first value, and in response to the maximum TB size being 32, setting the value of the first flag to be the second value. In some embodiments, the first flag can be syntax element sps_max_luma_transform_size_64_flag in Table 1 of FIG. 6.

At step 706, method 700 can include in response to the SBT being enabled and the value of the first flag being equal to a first value, signaling a second flag indicating a maximum coding unit (CU) size that allows the SBT. The second flag is not signaled in response to the SBT being disenabled or the value of the first flag being equal to a second value. For example, the second flag can be syntax element sps_sbt_max_size_64_flag as shown in Table 1 of FIG. 6. The syntax element sps_sbt_max_size_64_flag is signaled only when both syntax elements sps_max_luma_transform_size_64_flag and sps_sbt_enabled_flag are 1.

In some embodiments, method 700 can also include signaling a third flag (e.g., syntax element sps_sbt_enabled_flag as shown in Table 1 of FIG. 6) in the SPS indicating whether the SBT is enabled and signaling the first flag (e.g., syntax element sps_max_luma_transform_size_64_flag in Table 1 of FIG. 6) in the SPS.

In some embodiments, the maximum CU size can be 32 or 64. A maximum CU width or height that allows SBT can be determined based on a smaller one of the maximum TB size and the maximum CU size (e.g., according to Equation 1).

In some disclosed embodiments, syntax element sps_sbt_max_size_64_flag is not signaled at all. In that case, maximum allowed CU width and height of SBT directly depends on the syntax element sps_max_luma_transform_size_64_flag. If syntax element sps_max_luma_transform_size_64_flag is equal to 0, the maximum CU width and height for allowing SBT are 32 luma samples. If syntax element sps_max_luma_transform_size_64_flag is equal to 1, the maximum CU width and height for allowing SBT are 64 luma samples. In other words, MaxSbtSize is set equal to MaxTbSizeY. FIG. 8 illustrates an exemplary Table 2, according to some embodiments of the present disclosure. Table 2 shows an exemplary SPS syntax implementing these embodiments. As shown in Table 2, syntax element sps_sbt_max_size_64_flag is not signaled and is deleted from the syntax. FIG. 9 illustrates an exemplary Table 3, according to some embodiments of the present disclosure. Table 3 (emphases shown in italics) shows an exemplary coding unit (CU) syntax table that directly uses MaxTbSizeY to set the maximum CU width and height. MaxTbSizeY is computed based on the following Equation 3:

$$MaxTbSizeY = sps\_max\_luma\_transform\_size\_64\_flag\,?\,64:32 \qquad (Eq.\ 3)$$

Figure 10:
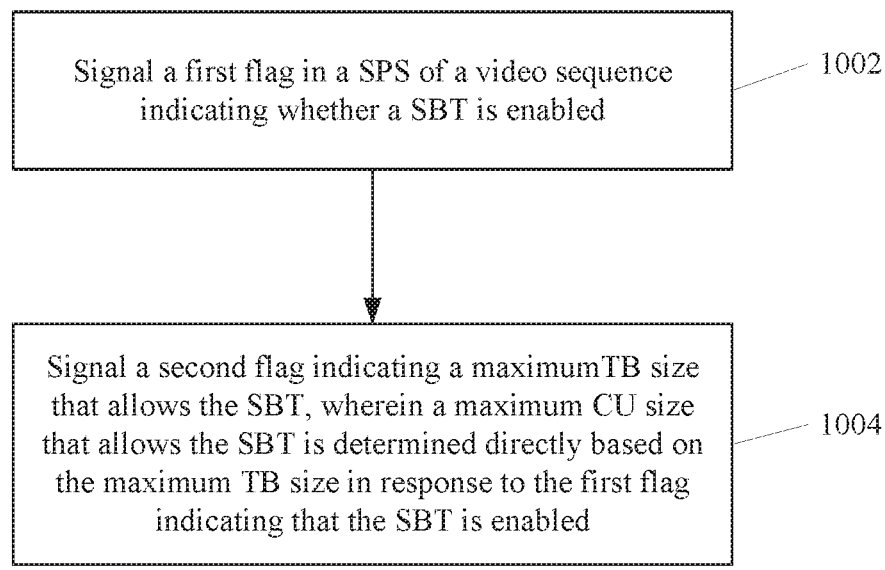
FIG. 10 illustrates a flowchart of another exemplary video processing method, according to some embodiments of the present disclosure.

FIG. 10 illustrates a flowchart of another exemplary video processing method 1000, according to some embodiments of the present disclosure. In some embodiments, method 1000 can be performed by an encoder (e.g., encoder 200 of FIG. 2), decoder (e.g., decoder 300 of FIG. 3) or one or more software or hardware components of an apparatus (e.g., apparatus 400 of FIG. 4). For example, a processor (e.g., processor 402 of FIG. 4) can perform method 1000. In some embodiments, method 1000 can be implemented by a computer program product, embodied in a computer-readable medium, including computer-executable instructions, such as program code, executed by computers (e.g., apparatus 400 of FIG. 4).

At step 1002, method 1000 includes signaling a first flag in a Sequence Parameter Set (SPS) of a video sequence indicating whether a sub-block transform (SBT) is enabled. In some embodiments, the first flag can be syntax element sps_sbt_enabled_flag as shown in Table 2 of FIG. 8. For example, syntax element sps_sbt_enabled_flag being equal to 0 can specify that SBT for inter-predicted CUs is disabled for the whole video sequence that refers to the SPS. And syntax element sps_sbt_enabled_flag equal to 1 can specify that SBT for inter-predicted CUs is enabled for the whole video sequence that refers to the SPS.

At step 1004, method 1000 can include signaling a second flag indicating a maximum transform block (TB) size that allows the SBT. The second flag can be set to a first vale or a second value. For example, the first value is 1 and the second value is 0. The maximum TB size can be 32, 64, or the like. In some embodiments, method 1000 can also include in response to the maximum TB size being 32, setting a value of the second flag to be 0, and in response to the maximum TB size being 64, setting a value of the second flag to be 1. In some embodiments, the first flag can be syntax element sps_max_luma_transform_size_64_flag in Table 2 of FIG. 8.

A maximum CU size that allows the SBT can be determined directly based on the maximum TB size in response to the first flag indicating that the SBT is enabled. For example, the maximum CU size is determined to be equal to the maximum TB size. The maximum CU size can include a maximum CU width and a maximum CU height.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A video processing method, comprising:
   determining whether a sub-block transform (SBT) is enabled in a Sequence Parameter Set (SPS) of a video sequence;

determining a value of a first flag in the SPS indicating a maximum transform block (TB) size that allows the SBT; and in response to the SBT being enabled and the value of the first flag being equal to a first value, signaling a second flag indicating a maximum coding unit (CU) size that allows the SBT.

2. The method according to clause 1, wherein the second flag is not signaled in response to the SBT being disenabled or the value of the first flag being equal to a second value.

3. The method according to clause 1 or 2, further comprising:

signaling third flag in the SPS indicating whether the SBT is enabled; and signaling the first flag in the SPS.

4. The method according to clause 2, wherein the first value is 1 and the second value is 0.

5. The method according to any one of clauses 1-4, wherein the maximum TB size is 32 or 64.

6. The method according to clause 5, further comprising: in response to the maximum TB size being 64, setting the value of the first flag to be the first value.

7. The method according to clause 5, further comprising: in response to the maximum TB size being 32, setting the value of the first flag to be the second value.

8. The method according to any one of clauses 1-7, wherein the maximum CU size that allows the SBT is 32 or 64.

9. The method according to any one of clauses 1-8, wherein a maximum CU width that allows SBT is determined based on a smaller one of the maximum TB size and the maximum CU size that allows the SBT.

10. The method according to any one of clauses 1-9, wherein a maximum CU height that allows SBT is determined based on a smaller one of the maximum TB size and the maximum CU size that allows the SBT.

11. A video processing apparatus, comprising:
at least one memory for storing instructions; and
at least one processor to execute the instructions to cause the apparatus to perform:
  determining whether a sub-block transform (SBT) is enabled in a Sequence Parameter Set (SPS) of a video sequence;
  determining a value of a first flag in the SPS indicating a maximum transform block (TB) size that allows the SBT; and
  in response to the SBT being enabled and the value of the first flag being equal to a first value, signaling a second flag indicating a maximum coding unit (CU) size that allows the SBT.

12. The apparatus according to clause 11, wherein the second flag is not signaled in response to the SBT being disenabled or the value of the first flag being equal to a second value.

13. The apparatus according to clause 11 or 12, wherein the at least one processor further executes the instructions to cause the apparatus to perform:

signaling a third flag in the SPS indicating whether the SBT is enabled; and signaling the first flag in the SPS.

14. The apparatus according to clause 12, wherein the first value is 1 and the second value is 0.

15. The apparatus according to any one of clauses 11-14, wherein the maximum TB size is 32 or 64.

16. The apparatus according to clause 15, further comprising:
in response to the maximum TB size being 64, setting the value of the first flag to be the first value.

17. The apparatus according to clause 15, further comprising:
in response to the maximum TB size being 32, setting the value of the first flag to be the second value.

18. The apparatus according to any one of clauses 11-17, wherein the maximum CU size that allows the SBT is 32 or 64.

19. The apparatus according to any one of clauses 11-18, wherein a maximum CU width that allows SBT is determined based on a smaller one of the maximum TB size and the maximum CU size that allows the SBT.

20. The apparatus according to any one of clauses 11-19, wherein a maximum CU height that allows SBT is determined based on a smaller one of the maximum TB size and the maximum CU size that allows the SBT.

21. A non-transitory computer-readable storage medium storing a set of instructions that is executable by at least one processor to cause the computer to perform a video processing method, comprising:
  determining whether a sub-block transform (SBT) is enabled in a Sequence Parameter Set (SPS) of a video sequence;
  determining a value of a first flag in the SPS indicating a maximum transform block (TB) size that allows the SBT; and
  in response to the SBT being enabled and the value of the first flag being equal to a first value, signaling a second flag indicating a maximum coding unit (CU) size that allows the SBT.

22. The non-transitory computer-readable storage medium according to clause 21, wherein the second flag is not signaled in response to the SBT being disenabled or the value of the first flag being equal to a second value.

23. The non-transitory computer-readable storage medium according to clause 21 or 22, wherein the set of instructions that is executable by the at least one processor causes the computer to further perform:

signaling a third flag in the SPS indicating whether the SBT is enabled; and signaling the first flag in the SPS.

24. The non-transitory computer-readable storage medium according to clause 22, wherein the first value is 1 and the second value is 0.

25. The non-transitory computer-readable storage medium according to any one of clauses 21-24, wherein the maximum TB size is 32 or 64.

26. The non-transitory computer-readable storage medium according to clause 25, wherein the set of instructions that is executable by the at least one processor causes the computer to further perform:
in response to the maximum TB size being 64, setting the value of the first flag to be the first value.

27. The non-transitory computer-readable storage medium according to clause 25, wherein the set of instructions that is executable by the at least one processor causes the computer to further perform:
in response to the maximum TB size being 32, setting the value of the first flag to be the second value.

28. The non-transitory computer-readable storage medium according to any one of clauses 21-27, wherein the maximum CU size that allows the SBT is 32 or 64.

29. The non-transitory computer-readable storage medium according to any one of clauses 21-28, wherein a maximum CU width that allows SBT is determined based on a smaller one of the maximum TB size and the maximum CU size that allows the SBT.

30. The non-transitory computer-readable storage medium according to any one of clauses 21-29, wherein a maximum CU height that allows SBT is determined based on a smaller one of the maximum TB size and the maximum CU size that allows the SBT.

31. A video processing method, comprising:
signaling a first flag in a Sequence Parameter Set (SPS) of a video sequence indicating whether a sub-block transform (SBT) is enabled; and
signaling a second flag indicating a maximum transform block (TB) size that allows the SBT,
wherein a maximum coding unit (CU) size that allows the SBT is determined directly based on the maximum TB size in response to the first flag indicating that the SBT is enabled.

32. The method according to clause 31, wherein the maximum CU size that allows the SBT is a maximum CU width or a maximum CU height.

33. The method according to clause 31 or 32, wherein the maximum CU size that allows the SBT is determined to be equal to the maximum TB size.

34. The method according to any one of clauses 31-33, wherein the maximum TB size is 32 or 64.

35. The method according to clause 34, further comprising:
in response to the maximum TB size being 32, setting a value of the second flag to be 0.

36. The method according to clause 34, further comprising:
in response to the maximum TB size being 64, setting a value of the second flag to be 1.

37. A video processing apparatus, comprising:
at least one memory for storing instructions; and
at least one processor to execute the instructions to cause the apparatus to perform:
signaling a first flap in a Sequence Parameter Set (SPS) of a video sequence indicating whether a sub-block transform (SBT) is enabled; and
signaling a second flag indicating a maximum transform block (TB) size that allows the SBT,
wherein a maximum coding unit (CU) size that allows the SBT is determined directly based on the maximum TB size in response to the first flag indicating that the SBT is enabled.

38. The apparatus according to clause 37, wherein the maximum CU size that allows the SBT is a maximum CU width or a maximum CU height.

39. The apparatus according to clause 37 or 38, wherein the maximum CU size that allows the SBT is determined to be equal to the maximum TB size.

40. The apparatus according to any one of clauses 37-39, wherein the maximum TB size is 32 or 64.

41. The apparatus according to clause 40, wherein the at least one processor further executes the instructions to cause the apparatus to perform:
in response to the maximum TB size being 32, setting a value of the second flag to be 0.

42. The apparatus according to clause 40, wherein the at least one processor further executes the instructions to cause the apparatus to perform:
in response to the maximum TB size being 64, setting a value of the second flag to be 1.

43. A non-transitory computer-readable storage medium storing a set of instructions that is executable by at least one processor to cause the computer to perform a video processing method, comprising:
signaling a first flag in a Sequence Parameter Set (SPS) of a video sequence indicating whether a sub-block transform (SBT) is enabled; and
signaling a second flag indicating a maximum transform block (TB) size that allows the SBT,
wherein a maximum coding unit (CU) size that allows the SBT is determined directly based on the maximum TB size in response to the first flag indicating that the SBT is enabled.

44. The non-transitory computer-readable storage medium according to clause 43, wherein the maximum CU size that allow the SBT is a maximum CU width or a maximum CU height.

45. The non-transitory computer-readable storage medium according to clause 43 or 44, wherein the maximum CU size that allows the SBT is determined to be equal to the maximum TB size.

46. The non-transitory computer-readable storage medium according to any one of clauses 43-45, wherein the maximum TB size is 32 or 64.

47. The non-transitory computer-readable storage medium according to clause 46, wherein the set of instructions that is executable by the at least one processor causes the computer to further perform:
in response to the maximum TB size being 32, setting a value of the second flag to be 0.

48. The non-transitory computer-readable storage medium according to clause 46, wherein the set of instructions that is executable by the at least one processor causes the computer to further perform:
in response to the maximum TB size being 64, setting a value of the second flag to be 1.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video encoding method, comprising:
signaling a first flag in a Sequence Parameter Set (SPS) of a bitstream associated with a video sequence, the first flag indicating whether a sub-block transform (SBT) is enabled; and
signaling, in the SPS, a second flag indicating a maximum transform size in luma samples,
wherein a maximum coding unit (CU) size that allows the SBT is determined based on a value of the second flag,
wherein the CU size that allows the SBT is determined to be:
64 if the value of the second flag is 1, and
32 if the value of the second flag is 0.

2. The method according to claim 1, wherein the maximum CU size that allows the SBT is a maximum CU width or a maximum CU height.

3. The method according to claim 1, wherein the maximum CU size that allows the SBT is determined to be equal to the maximum transform size.

4. The method according to claim 1, further comprising:
in response to the value of the second flag being 0, setting the maximum transform size to be 32.

5. The method according to claim 1, further comprising:
in response to the value of the second flag being 1, setting the maximum transform size to be 64.

6. The method according to claim 1, wherein the second flag is sps_max_luma_transform_size_64_flag.

7. The method according to claim 1, wherein the first flag is sps_sbt_enabled_flag.

8. A video decoding method, comprising:
receiving a bitstream associated with a video sequence, a Sequence Parameter Set (SPS) of the bitstream comprising:
a first flag indicating whether a sub-block transform (SBT) is enabled, and
a second flag indicating a maximum transform size in luma samples; and
in response to a value of the second flag being 1, determining a maximum coding unit (CU) size that allows the SBT to be 64, or
in response to the value of the second flag being 0, determining the maximum CU size that allows the SBT to be 32.

9. The method according to claim 8, wherein the maximum CU size that allows the SBT is a maximum CU width or a maximum CU height.

10. The method according to claim 8, further comprising:
determining the maximum CU size that allows the SBT to be equal to the maximum transform size.

11. The method according to claim 8, further comprising:
in response to the value of the second flag being 0, determining the maximum transform size to be 32.

12. The method according to claim 8, further comprising:
in response to the value of the second flag being 1, determining the maximum transform size to be 64.

13. The method according to claim 8, wherein the second flag is sps_max_luma_transform_size_64_flag.

14. The method according to claim 8, wherein the first flag is sps_sbt_enabled_flag.

15. A non-transitory computer readable storage medium storing a bitstream associated with a video sequence, the bitstream comprising:
a Sequence Parameter Set (SPS), the SPS comprising:
a first flag indicating whether a sub-block transform (SBT) is enabled, and
a second flag indicating a maximum transform size in luma samples; and
wherein the second flag causes a decoder to determine a maximum coding unit (CU) size that allows the SBT to be:
64 if the value of the second flag is 1, and
32 if the value of the second flag is 0.

16. The non-transitory computer readable storage medium according to claim 15, wherein the maximum CU size that allows the SBT is a maximum CU width or a maximum CU height.

17. The non-transitory computer readable storage medium according to claim 15, wherein the second flag causes the decoder to determine the maximum transform size to be 32 if the value of the second flag is 0.

18. The non-transitory computer readable storage medium according to claim 15, wherein the second flag causes the decoder to determine the maximum transform size to be 64 if the value of the second flag is 1.

19. The non-transitory computer readable storage medium according to claim 15, wherein the second flag is sps_max_luma_transform_size_64_flag.

20. The non-transitory computer readable storage medium according to claim 15, wherein the first flag is sps_sbt_enabled_flag.

* * * * *